Patented May 14, 1940

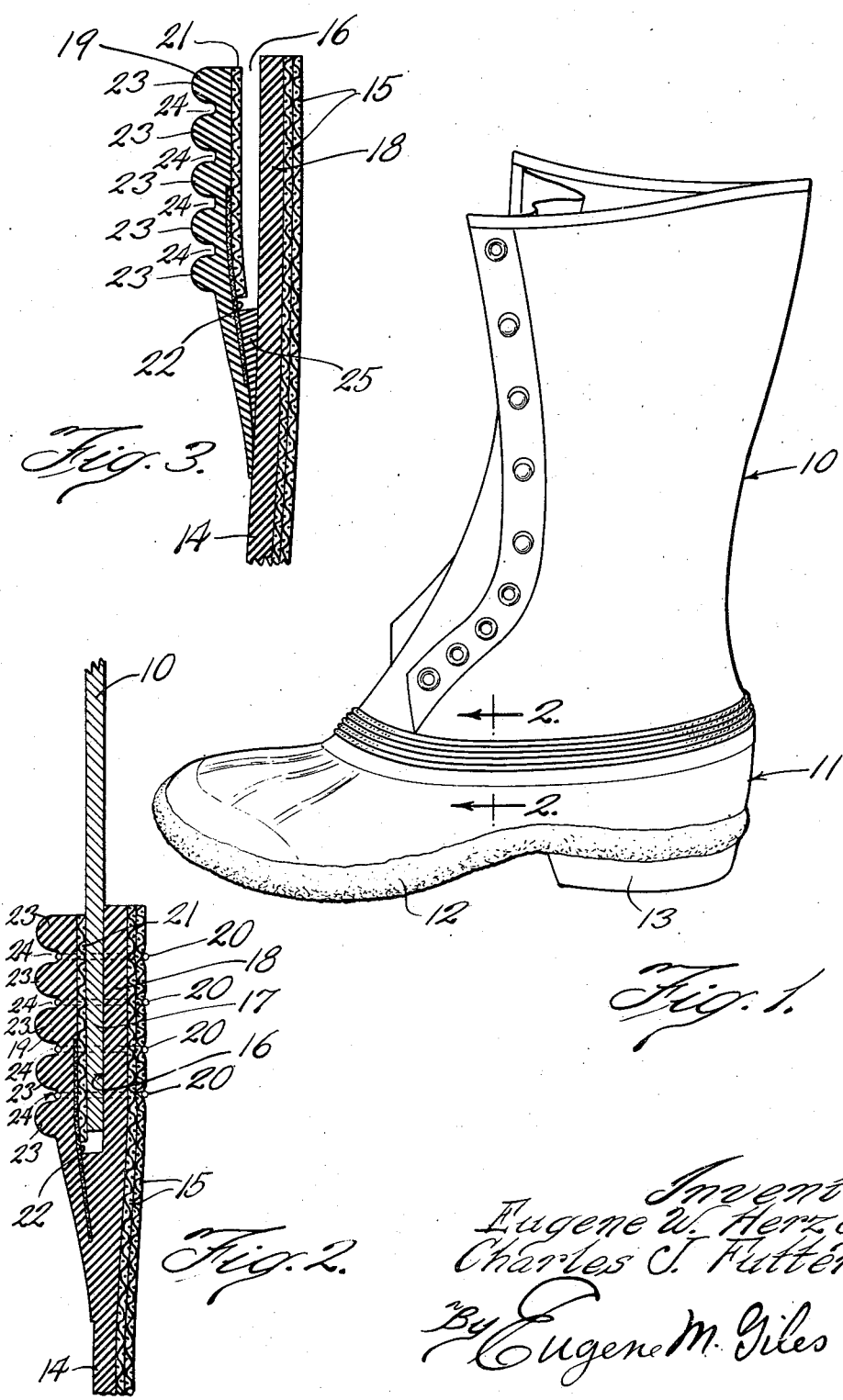

2,200,333

UNITED STATES PATENT OFFICE 2,200,333

ARTICLE OF FOOTWEAR

Eugene W. Herzog and Charles J. Futter, Mishawaka, Ind., assignors to Mishawaka Rubber and Woolen Manufacturing Company, Mishawaka, Ind., a corporation of Indiana Application October 13, 1937, Serial No. 168,691

5 Claims. (Cl. 36—4)

Our invention relates to boots and shoes wherein a rubber foot portion is attached to a top of leather or other material that cannot be secured to the rubber satisfactorily by vulcanization and has reference more particularly to the joint by which such parts are connected.

As footwear of the above mentioned character is usually subjected to hard usage, it is necessary that the leather and rubber parts be joined together securely to withstand the strains of such usage and to this end it has been customary to apply the leather top so that a substantial width thereof along the lower edge overlaps the upper edge portion of the rubber foot portion and to secure the overlapped portions together by a number of lines of stitches. It not only is desirable to protect these lines of stitches against wear or scuffing that might weaken the connection, but also since such footwear is usually worn in wet places, it is important that the stitches and the leather portion through which they are engaged to be protected against exposure to moisture or other conditions that might promote rotting and impair the security and permanence of the connection.

This is accomplished with the present invention by forming the rubber foot portion with a recess around the top into which the lower margin of the leather top is inserted so that it is confined between inner and outer rubber wall portions and the lines of stitches are engaged through both of the rubber walls and the intermediate leather, the rubber walls being suitably reinforced to insure ample strength and the outer rubber wall of the recess preferably being externally ribbed with the lines of stitches located in the grooves between the ribs to protect the exposed ends of the stitches against wear or scuffing. Thus the stitched portion of the leather is confined in a rubber pocket which is completely sealed along the bottom so that the lower edge and outer side of the stitched leather is protected against moisture and scuffing and as this stitched portion of the leather is clamped by the lines of stitches between the rubber walls of the pocket and the stitches securely anchored at both sides of the leather in rubber and rubber reinforcing, a joint of greatly increased strength is assured.

The principal objects of our invention are to provide a method of and means for connecting leather and rubber shoe parts or the like in an improved manner; to insure a connection of greater strength and durability in which the joint forming parts are effectively protected against moisture and other conditions that might impair the security and permanence of the joint; to construct the rubber part with a waterproof pocket in which the joint forming portion of the leather is confined and secured; to insure a firm anchorage and sealing of the stitches at both sides of the leather; and to construct the joint so that it has a neat and attractive appearance, these and other objects being accomplished as will more fully appear from the following description wherein reference is had to the accompanying drawing in which:

Fig. 1 is a side view of a shoe having a leather top and a rubber foot joined together in accordance with this invention;

Fig. 2 is an enlarged sectional view of the joint taken on the line 2—2 of Fig. 1; and Fig. 3 is a similar view showing the pocket structure of the rubber foot portion as assembled preparatory to vulcanization.

Referring to the drawing in which the invention is shown in connection with a type of shoe that is commonly made with a leather top and a rubber foot portion, the reference numeral 10 indicates the leather top and 11 the rubber foot portion, the latter of which is constructed in the usual manner with a rubber sole 12 and rubber heel 13 and has a side wall 14 of rubber, preferably lined with two layers 15 of fabric. In footwear of this character it is the practice to vulcanize the rubber foot portion and thereafter attach the leather top to the vulcanized rubber foot portion by merely overlapping and stitching the lower margin of the leather top to the outer side of the upper margin of the rubber foot portion.

With our invention, however, the rubber foot portion 11 is formed and vulcanized with a pocket 16 around the top to receive the lower margin 17 of the leather top 10 so that the said leather margin 17 is confined between inner and outer pocket walls 18 and 19 respectively of rubber and said lower margin 17 of the leather top is secured in said pocket 16 by a number of rows of stitches 20 which engage through both rubber walls 18 and 19 and the fabric linings 15.

The rubber walls 18 and 19, which are united along the bottom of the pocket and constitute an integral part of the vulcanized rubber foot portion 11, are preferably arranged in a manner to insure substantially uniform spacing thereof from the top to the bottom of the pocket in order to readily accommodate the leather portion 17 therebetween to the full depth of the pocket, and the rubber wall 19 is preferably lined on the inner side with a layer 21 of fabric, the lower portion of which overlaps and is secured to a thin fabric reinforcing 22 which is secured to the inner face of the rubber wall 19 and extends downwardly into and is united with the rubber below the pocket as shown. Thus the outer wall 19 and the connection thereof with the rubber foot portion 11 is thoroughly reinforced and it is to be noted that the rows of stitches 20 not only pass through the lining fabric 21 but one or more of the lowermost rows of stitches are also passed through the reinforcing fabric 22 that is embedded in the rubber below the pocket.

The outer face of the rubber wall 19 is preferably ribbed as indicated at 23 to provide channels 24 extending around the top of the rubber foot portion in which the lines of stitches 20 are located, thereby not only protecting the outer ends of the stitches against scuffing and wear but also enhancing the appearance of the shoe, and the rubber, below the lowermost rib 23 is beveled or sloped inwardly to the side wall of the rubber foot portion 11 to avoid any appreciable offset which would impair the appearance of the shoe.

In making up this shoe the rubber foot portion 11 is assembled on a last in the usual manner with sole 12, heel 13, linings 15 and rubber side wall 14, after which the parts which cooperate with the upper portion of the side wall 14 to provide the pocket 16 are applied. These parts may all be assembled in a unit which is applied to the side wall 14, but we prefer to first apply a beveled strip 25 of rubber compound entirely around the rubber foot 11 at a distance from the upper edge of the rubber wall 14 corresponding to the desired depth of the pocket 16, said strip being of a width at the top corresponding to the desired width of the pocket and tapered downwardly to a feather edge as shown and cemented onto the side wall 14 in the usual manner in preparation for vulcanization thereto. A separate strip consisting of the ribbed rubber composition strip 19, lining 21 and reinforcing 22 is prepared, the thin reinforcing fabric 22 being frictioned on both sides and cemented to the inner face of the ribbed rubber strip 19 and the lining fabric 21 being friction coated only on one side which is then cemented to the inner face of the ribbed rubber strip 19 and to the fabric reinforcing 22, the exposed inner face of the fabric lining 21 being left uncoated to avoid possibility of accidentally uniting with the opposed rubber wall 18 of the pocket during the subsequent vulcanization, and after the composite strip 19, 21 and 22 is thus prepared it is cemented onto the beveled strip 25 and the adjoining portion of the side wall 11 immediately below the strip 25 as shown in Fig. 3, the meeting ends of the composite strip 19, 21, 22 being cemented together so that it extends in a continuous manner around the top of the rubber foot portion 11.

The rubber foot portion as thus prepared is then vulcanized and after vulcanization the leather top 10, which has previously been assembled, is attached thereto by inserting the lower marginal portion 17 thereof into the pocket 16 substantially to the full depth thereof and stitching the parts together by the rows of stitches 20 which are applied so that they are located in the channels 24 between the ribs 23.

Thus the leather attaching portion 17 is confined in the rubber pocket 16 and protected against scuffing and moisture and is securely clamped between and interlocked with the reinforced rubber walls 18 and 19 of the pocket by lines of stitches 20 which not only are anchored at both sides of the leather but are tightly and securely engaged at both sides of the leather by the reinforced rubber against release and sealed thereby against any injurious penetration of moisture. Moreover, the ribbed outer wall not only protects the exposed ends of the stitches as well as the leather against scuffing and wear, but it also imparts an attractive appearance to the shoe while the sloping connection thereof with the rubber wall 14 gives the joint a neat and finished appearance.

While we have shown and described our invention in a preferred form, we are aware that various changes and modifications may be made therein without departing from the principles of our invention, the scope of which is to be determined by the appended claims.

We claim as our invention:

1. An article of footwear of the class described, comprising a vulcanized rubber foot portion of a height to terminate at its upper edge below the ankle of a wearer and provided with an open-top and closed-bottom channel in and around the upper edge thereof, the side walls of the channel being integral upright parallel parts of the rubber foot portion, fabric reinforcing secured to the inner face of the outer wall of the channel and extending downwardly into the rubber below the closed bottom of the channel, and an upper having the lower margin thereof in and filling said channel and secured to the opposite side walls of the channel by stitches passing through the side walls of the channel, the fabric reinforcing and the included lower margin of the said upper.

2. An article of footwear of the class described, comprising a vulcanized rubber foot portion having an open-top and closed-bottom channel in and around the upper edge of said foot portion, the side walls of the channel being integral upright parallel parts of the rubber foot portion, a fabric reinforcing secured to the inner face of the outer wall of the channel and extending downwardly into the rubber below the closed bottom of the channel, a fabric lining secured to the inner face of the outer wall of the channel and overlapping and secured to the fabric reinforcing, an upper having a lower marginal portion in and filling said channel, and stitches extending through the side walls of the channel, the lining and the included lower portion of said upper.

3. An article of footwear of the class described, comprising a rubber foot portion of a height to terminate at its upper edge below the ankle of a wearer, a downwardly tapered rubber strip applied to the outer face of the said foot portion below the top edge thereof, a second rubber strip applied to the outer face of the beveled strip and to the rubber foot portion below the beveled strip, a fabric reinforcement extending along the inner face of the second rubber strip and downwardly between the strips, the two strips and the side wall of the foot portion defining a channel closed at its bottom and open at its top, the foot portion and the two strips being vulcanized into a unitary structure, an upper having its lower portion included in the channel, and stitches passing through the opposite sides of the channel and the included portion of the upper.

4. An article of footwear of the class described, comprising a vulcanized rubber foot portion of a height to terminate at its upper edge below the ankle of the wearer and provided with an open-top and closed-bottom channel in and around the upper edge thereof, the side walls of the channel being integral, upright parallel parts of the rubber foot portion, fabric reinforcing for the outer wall of the channel and extending downwardly into the rubber below the closed bottom of the channel and an upper having the lower margin thereof in and filling said channel and secured to the opposite side walls of the channel by stitches passing through the side walls of the channel, the fabric reinforcing and the included lower margin of the said upper.

5. An article of footwear of the class described, comprising a vulcanized rubber foot portion having an open-top and closed-bottom channel in and around the upper edge of said foot portion, the side walls of the channel being integral upright parallel parts of the rubber foot portion, a fabric reinforcing for the outer wall of the channel and extending downwardly into the rubber below the closed bottom of the channel, a fabric lining secured to the inner face of the outer wall of the channel and overlapping and secured to the fabric reinforcing, an upper having a lower marginal portion in and filling said channel, and stitches extending through the side walls of the channel, the lining and the included lower portion of said upper.

EUGENE W. HERZOG.
CHARLES J. FUTTER.